United States Patent [19]
Millar et al.

[11] 3,874,048
[45] Apr. 1, 1975

[54] METHOD AND APPARATUS FOR FABRICATING TUBING

[75] Inventors: Barry C. Millar, Islington; Keith W. Little, Georgetown, both of Ontario, Canada

[73] Assignee: Bundy Corporation, Detroit, Mich.

[22] Filed: Dec. 4, 1972

[21] Appl. No.: 311,952

[52] U.S. Cl. ............... 29/33 K, 10/12 T, 10/166, 29/33 P, 29/33 T, 29/200 A, 29/200 B, 29/430, 29/512, 29/563, 29/568, 72/369, 72/422, 198/19, 214/1 B
[51] Int. Cl. ............................................. B23p 23/00
[58] Field of Search ............ 72/405, 419, 420, 421, 72/426, 427, 455, 27, 28, 293, 317, DIG. 11, 24, 306, 311, 369, 388, 422; 10/12 T, 166; 198/19, 22 R, 25, 27, 28; 29/200 A, 200 B, 33 D, 33 K, 33 P, 33 T, 430, 512, 523, 563, 564, 565, 568, DIG. 43; 214/1 BD, 1 P, 2.5, 3

[56] References Cited
UNITED STATES PATENTS
2,176,188  10/1939  Poole et al. ..................... 29/33 K
2,825,075  3/1958  De Loe ........................... 10/12 T
3,120,770  2/1964  Hoyt ................................ 72/422
3,362,209  1/1968  Sassak .......................... 72/363 X
3,696,481  10/1972  Schmidt ..................... 29/200 B X

*Primary Examiner*—C. W. Lanham
*Assistant Examiner*—Joseph A. Walkowski
*Attorney, Agent, or Firm*—Harness, Dickey & Pierce

[57] ABSTRACT

Tubing is cut to measured lengths which are fed to a series of aligned work stations where they are progressively operated upon by assembling end fittings, flaring the ends, and then bending the tubes to the required shape. Transfer between stations is accomplished by oscillating shafts disposed between the stations carrying transfer arms which swing back and forth above the work level. Each work station has a pair of tube clamps and each pair of arms carries grab clamps. Controls prevent release of the tube clamps at each station until the grab clamps have engaged the tube, and prevent release of the grab clamps until the tube clamps at the next station have engaged the tube. In this manner, lateral positioning of the tubes is controlled. The tubes are end-aligned before each flare station and the first bending station.

30 Claims, 24 Drawing Figures

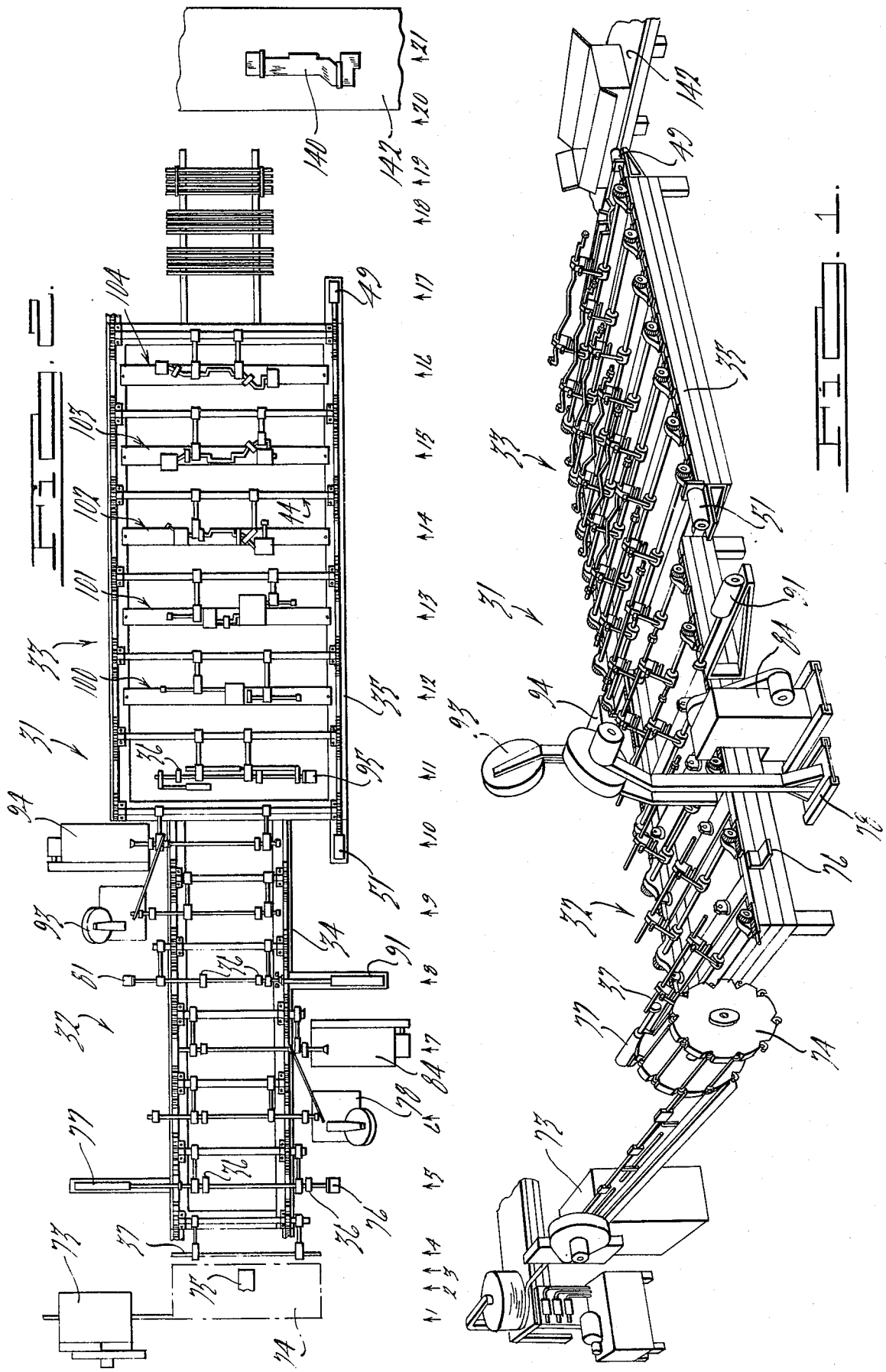

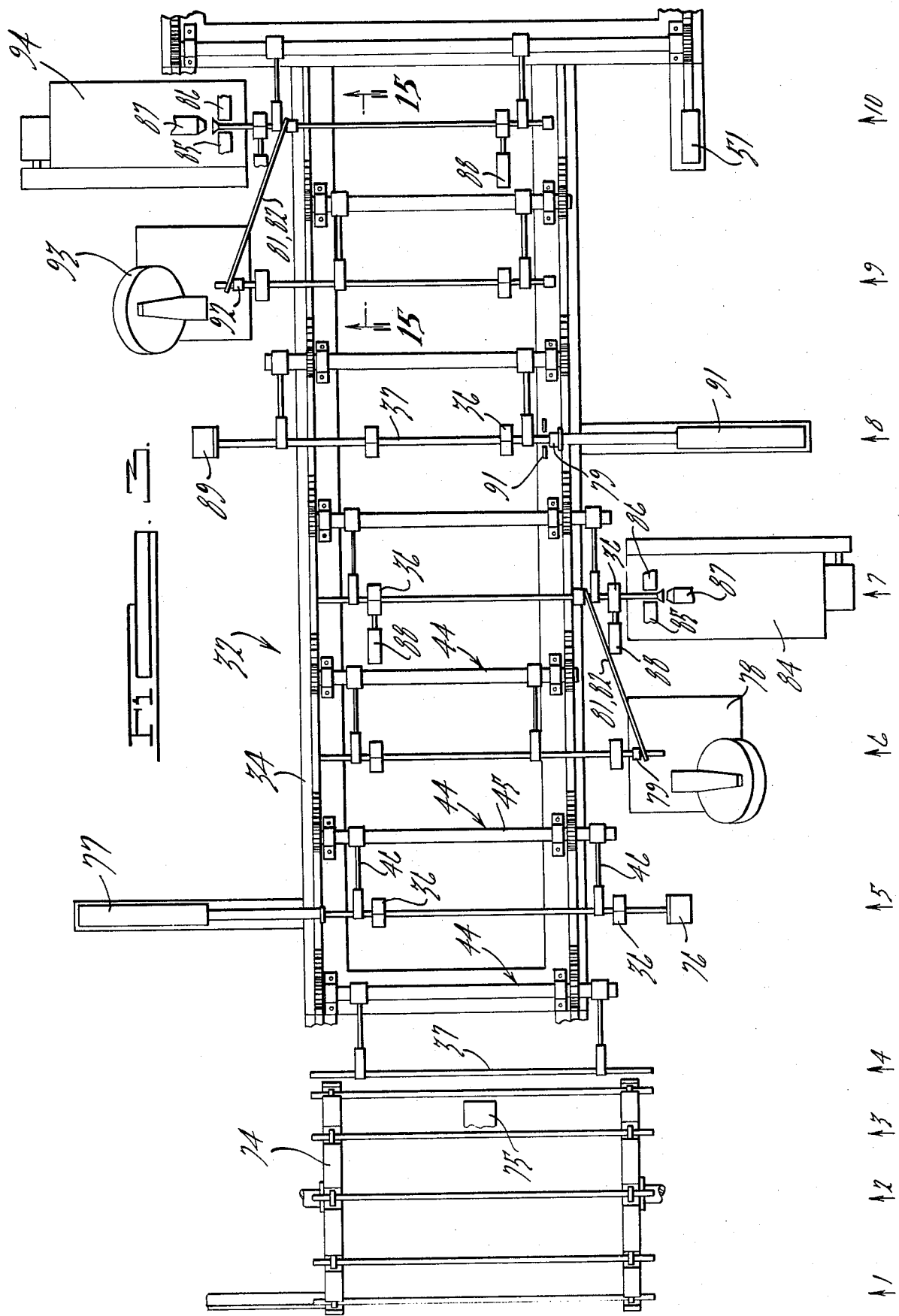

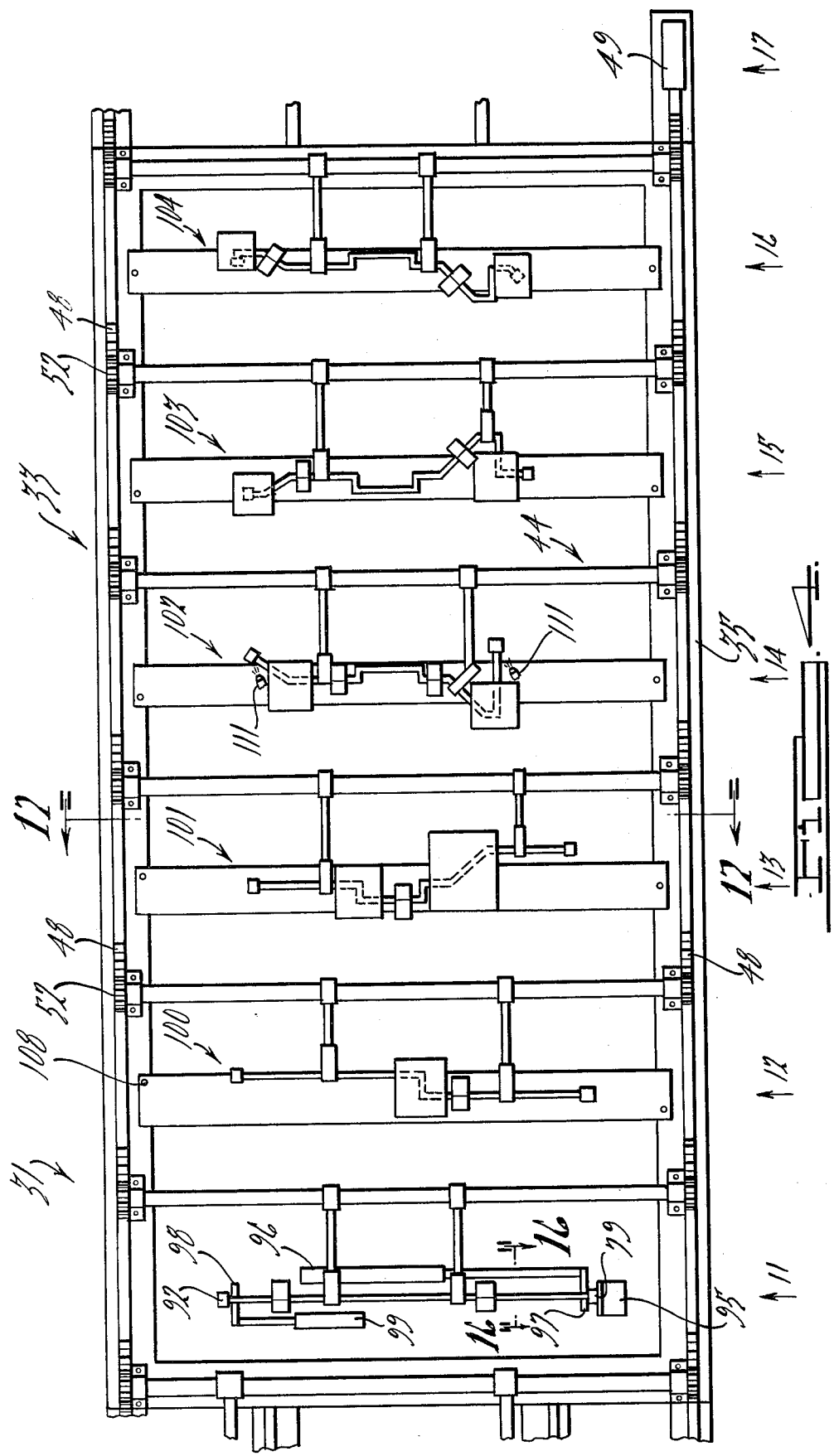

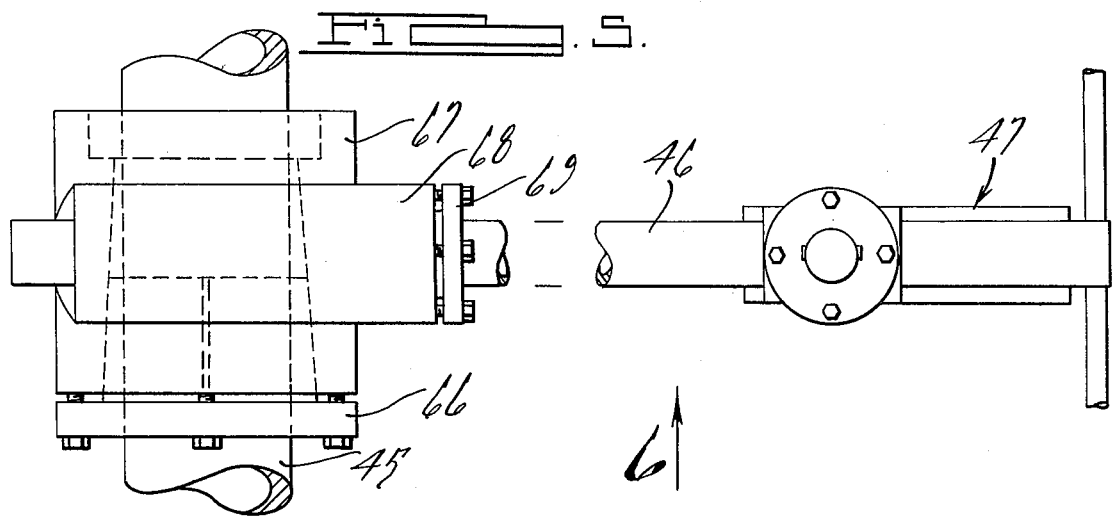
FIG. 5.
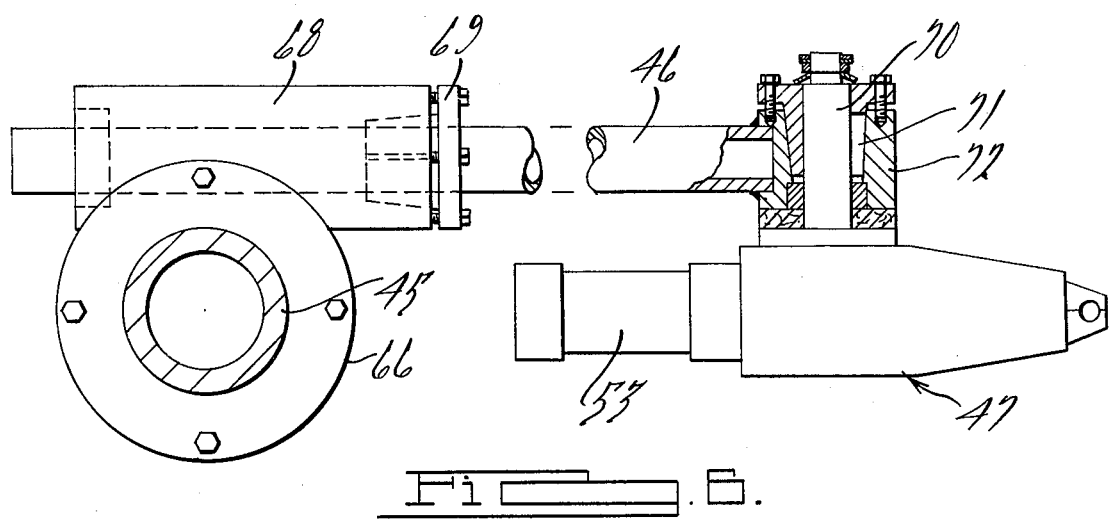
FIG. 6.
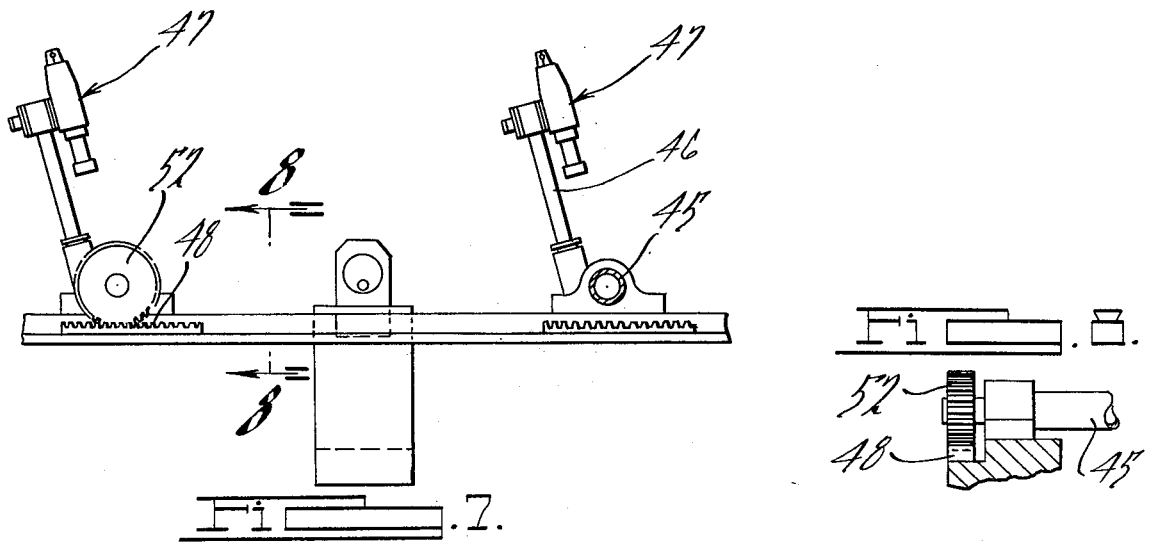
FIG. 7.
FIG. 8.

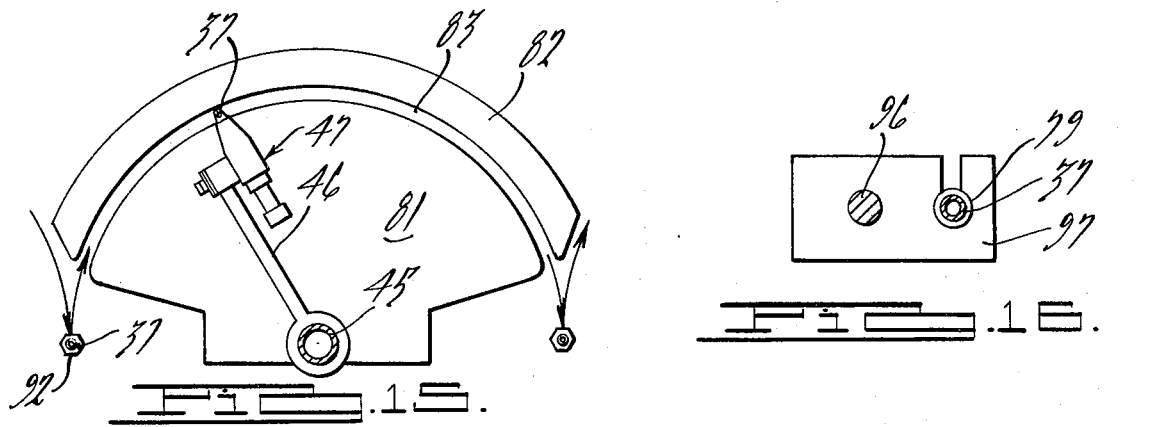
FIG. 15.
FIG. 16.
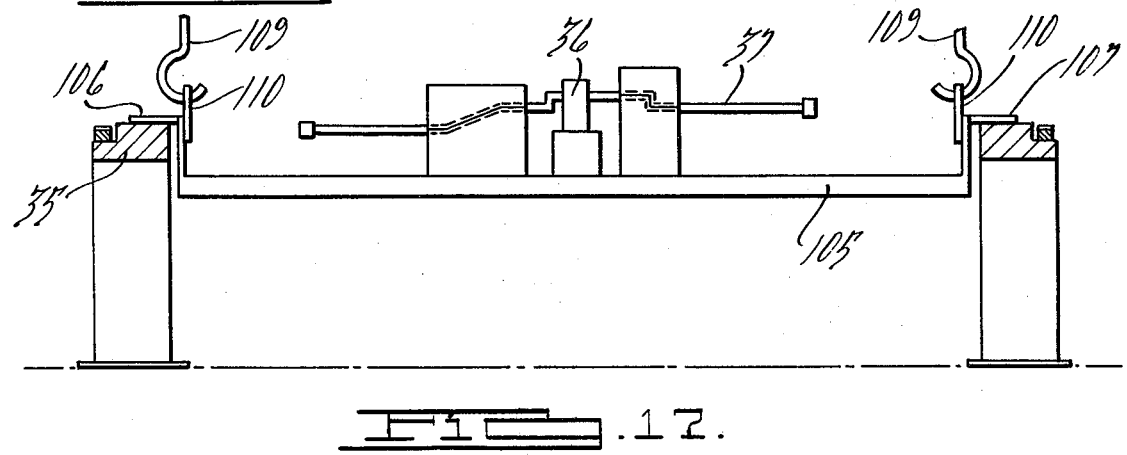
FIG. 17.
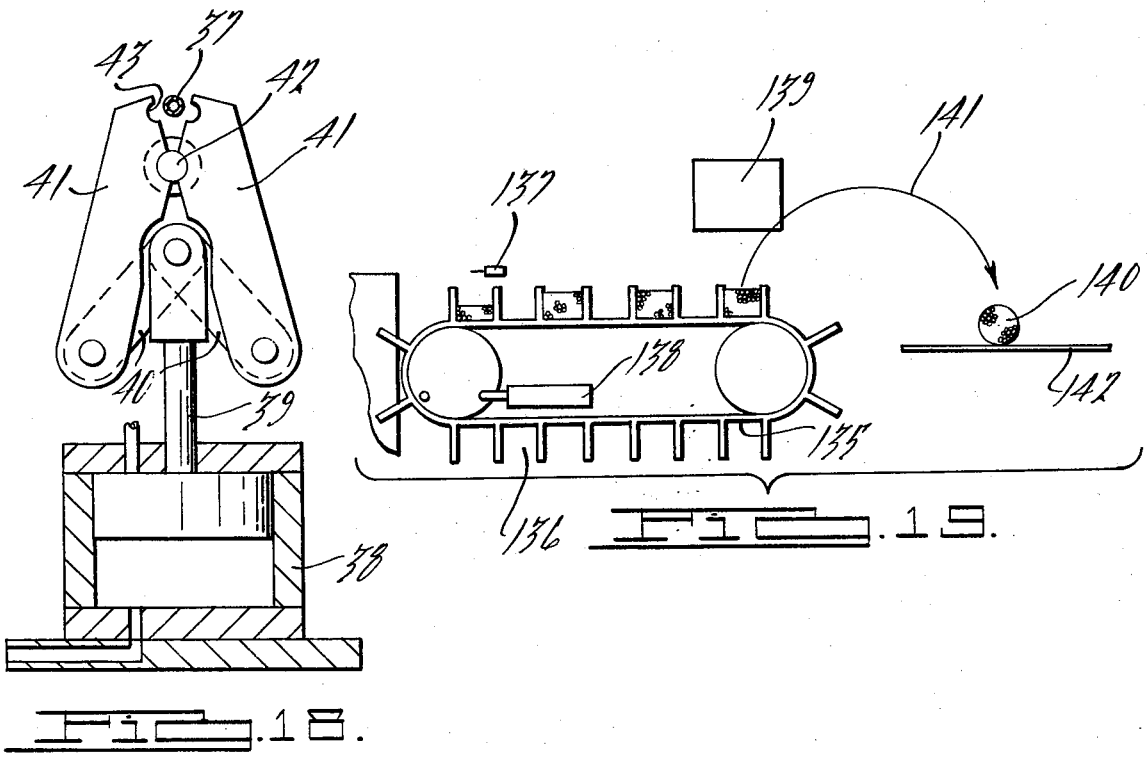
FIG. 18.
FIG. 19.

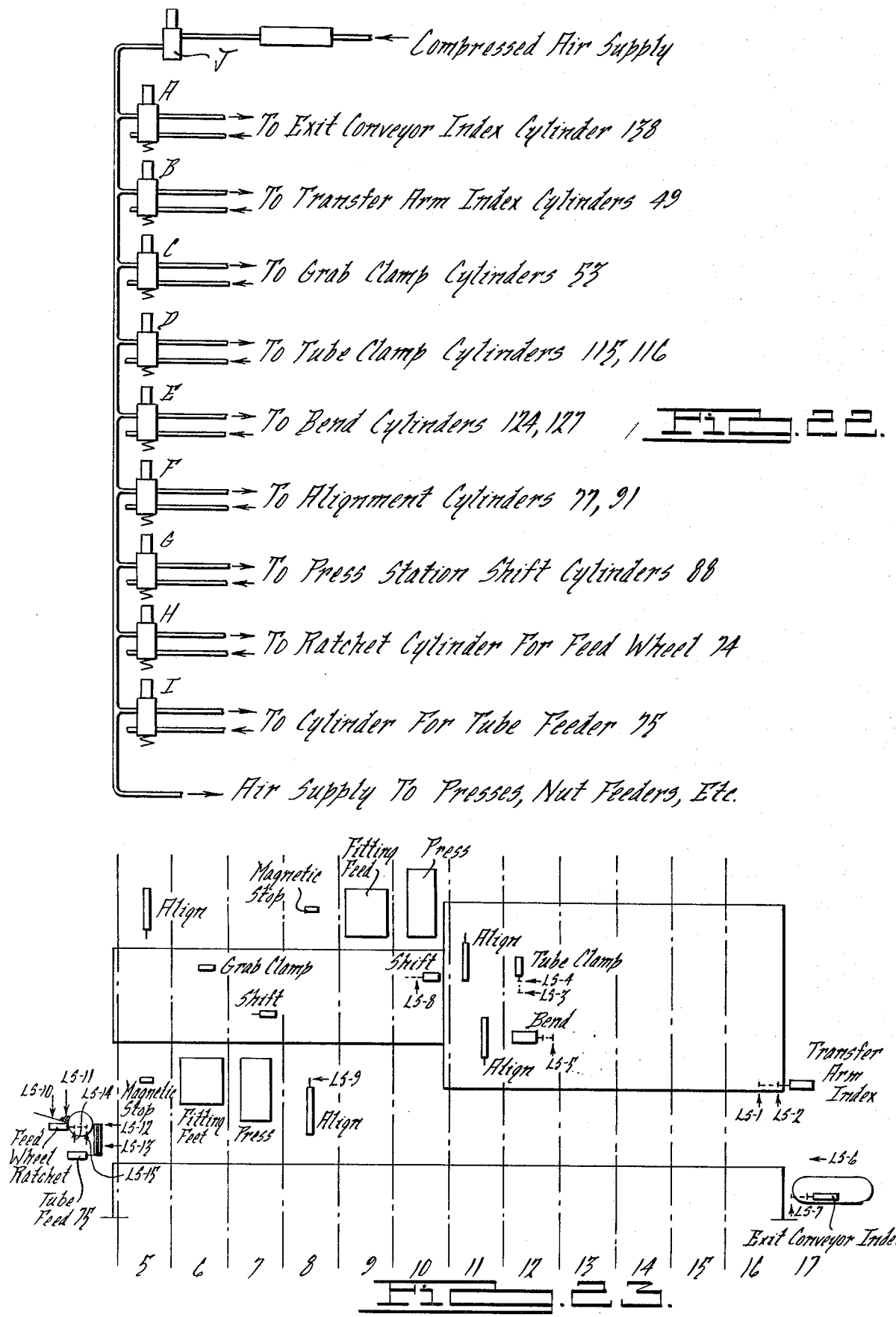

३,८७४,०४८

METHOD AND APPARATUS FOR FABRICATING TUBING

BACKGROUND OF THE INVENTION

1. Field of the Invention

This invention relates to the manufacture of fabricated tubes such as are used in large quantities for automobiles or other products. Examples of such tubes are fuel, vapor, brake, or transmission oil cooler lines. Customarily, these tubes have rather involved and assymetrical bends at different angles, and in some cases have parts assembled on them such as armor coils or flared fitting couplers. The material used for these tubes is frequently copper bonded or welded steel.

2. Description of the Prior Art

Conventional systems for fabricating tubing of this type involve operating on the tube at several different locations, for example mounting the end fittings and flaring the tube at one place and imparting the required bends somewhere else. The tubing in process is moved between these operations by hand loaded and hand pushed trucks or similar devices. Operations such as flaring take place at a much higher rate than bending so that the conventional system requires a significant in-process inventory of partially fabricated parts to optimize loading of the unit machines. The result is that the conventional methods might require a period of days or weeks from the time the tubing is originally cut up until the finished fabricated tube length is shipped to the customer.

Other problems with conventional tube fabricating systems concern the bending operations particularly. In conventional bending, a gravity ejection system is frequently used for the finished tubing. This places severe limitations on the tool design. Moreover, minor changes in the design of a tube to be bent sometimes required major changes in the bending tooling.

The following patents were noted in a novelty search on the invention covered by this application:

| | |
|---|---|
| 3,362,209 | 2,100,028 |
| 2,565,717 | 2,272,758 |
| 3,431,759 | 2,825,075 |
| 2,964,085 | 3,120,770 |
| 3,104,685 | 3,165,766 |
| 3,175,386 | 3,633,766 |
| 3,420,279 | 3,466,917 |
| | 3,245,433 |

BRIEF SUMMARY OF THE INVENTION

It is an object of the present invention to provide a novel and improved method and apparatus for fabricating tubing which greatly increases the production rate and reduces labor costs as compared with previous methods and apparatus.

It is a further object to provide an improved method and apparatus of this nature which better utilizes plant space, eliminates in-process inventories and permits mechanization or other improved systems of fixture storage.

It is also an object to provide a method and apparatus for fabricating tubing which eliminates the need for drop-out of parts at bending stations, thus permitting tooling to be constructed more rigidly and resulting in more uniform parts.

It is another object to provide an improved method and apparatus of this type which reduces scrap rates by eliminating handling of parts and providing a transfer and bending system which tolerates the degree of out-of-straightness generally found in commercial tubing.

It is a further object to provide a method and apparatus for fabricating tubing which reduces the cost and complexity of changes in part design without adversely affecting fixture performance and makes possible the use of automatic inspection systems, automated parts bundling and conveyorized handling of groups of finished parts.

It is another object to provide a method and apparatus of this type which enables effective guards to be installed at modest cost to meet safety requirements.

It is a further object to provide a method and apparatus for fabricating tubing which simplifies cost and production efficiency control and offers the possibility of decreasing fixture costs by utilizing standard components.

It is also an object to provide a method and apparatus of this type in which various stations or components of the bending tooling may be effectively constructed in different locations or by different builders and thereafter assembled on the apparatus with a minimum of difficulty.

It is another object to provide an apparatus of this type comprising grab clamps having jaws with means for extending them while in open position, closing them around a tubular member or the like, opening them and then retracting them so the grab clamp can be moved at right angles to the tubular member.

Briefly, the method of this invention comprises the steps of preparing tubes of constant length, indexing them in unison along a series of work stations while holding them substantially at right angles to their path of movement, placing operational holds on the tubes as they reach the work stations, releasing the indexing holds, performing simultaneous operations on the tubes at these work stations while so held, placing indexing holds on the tubes after the operations, releasing the operational holds, simultaneously indexing the tubes to the next work stations, placing operational holds on them at said next work stations and releasing the indexing holds. In the illustrated embodiment, the operations performed on the tubes include positioning the tubes endwise so as to place fittings on and flare the ends and bending the tubes at progressively outward portions thereof. The indexing is along arcuate paths above the work stations.

The apparatus of this invention comprises in essence a tube supply station providing tubes cut to a certain length, work stations including at least one end forming and one bending station, and transfer means for moving the tubes along a path through said work stations and operable to hold them generally perpendicular to their path and control their positions in a direction generally parallel to their length. Means are provided at each work station for holding the tubes, and there are means for preventing release of tubes at each work station until they have been secured by the transfer clamping means, and preventing release of the transfer clamping means at the next work stations until they have been secured thereat.

The means for indexing the tubes includes shafts rockably mounted between the work stations, transfer arms extending from the shafts and grab clamps mounted on the transfer arms. The arms swing in arcuate paths above the work stations as they transport the tubes. The grab clamps have means for extending them while in open position, closing them around the tubes, opening them when the tubes are clamped at the next work stations, and retracting the clamp jaws. The work stations include means for end-aligning the tubes, assembling parts such as fittings on their ends, and flaring the ends. The tubes are further end-aligned before the bending stations, and the latter comprise tooling bars removably mounted on a supported framework.

BRIEF DESCRIPTION OF THE DRAWINGS

FIG. 1 is a perspective view of the apparatus of this invention showing its overall configuration, the locations of the components not necessarily being consistent with the plan views.

FIG. 2 is a partially schematic overall plan view of the invention.

FIG. 3 is an enlarged partially schematic plan view of the left-hand portion of FIG. 2.

FIG. 4 is an enlarged partially schematic plan view of the right-hand portion of FIG. 2.

FIG. 5 is a plan view with parts broken away of one of the transfer arms shown in its delivery position.

FIG. 6 is a side elevational view of FIG. 5 taken in the direction of the arrow 6 thereof.

FIG. 7 is a fragmentary side elevational view showing the manner of driving the rockable transfer shafts.

FIG. 8 is a fragmentary cross-sectional view in elevation taken along the line 8—8 of FIG. 7.

FIG. 15 is a partially schematic side elevational view taken along the line 15—15 of FIG. 3, parts being omitted for clarity, showing the shaped plates used to shift a fitting along the tube when the latter is being transferred from the fitting feed station to the flare station.

FIG. 16 is a fragmentary side elevational view in cross-section taken along the line 16—16 of FIG. 4 and showing a fitting rake.

FIG. 17 is a cross-sectional view in elevation taken along the line 17—17 of FIG. 4 and showing a tooling bar.

FIG. 18 is a partially schematic view illustrating a typical style of tube clamp at a work station.

FIG. 19 is a schematic view showing a bundle conveyor at the end of the line.

FIG. 22 is a schematic air circuit diagram thereof.

FIG. 23 is a schematic layout showing the location of air cylinders and limit switches.

DESCRIPTION OF THE PREFERRED EMBODIMENT

Figure 9:
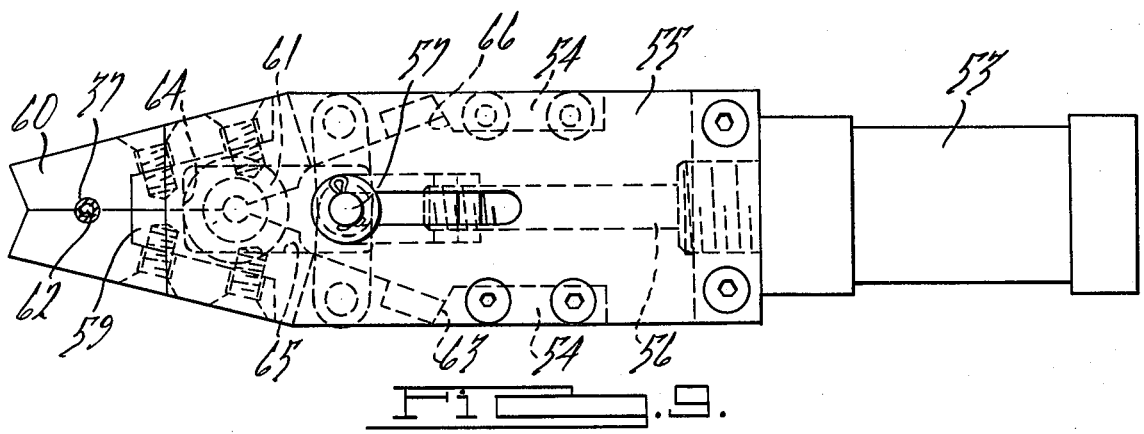
FIG. 9 is a side elevational view of one of the transfer grab clamps shown in the pick-up position.
Figure 10:
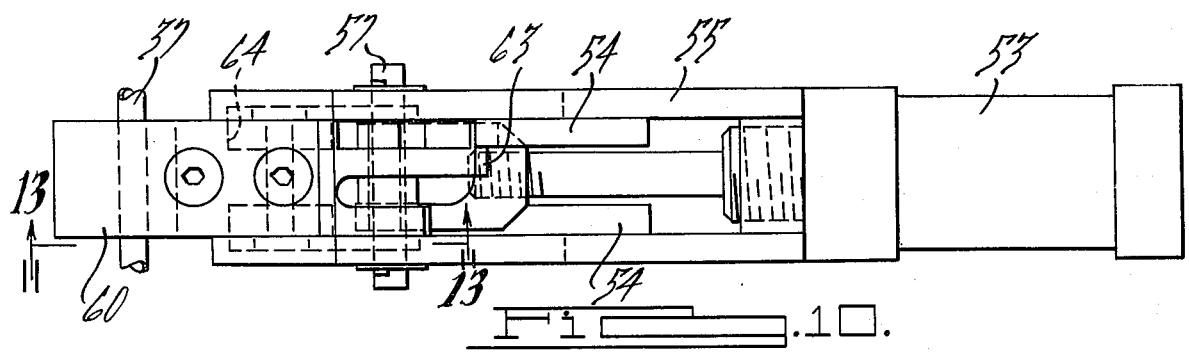
FIG. 10 is a top plan view thereof.
Figure 11:
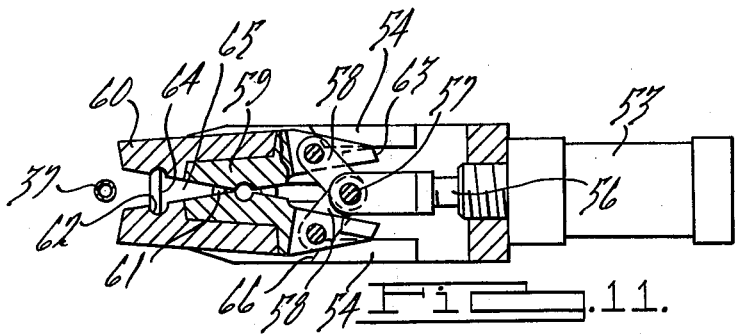
FIG. 11 is a partially schematic cross-sectional view showing the grab clamps in their retracted and open position.

Referring first to FIGS. 1 to 4, the transfer line is generally indicated at 31 and is shown as having 31 stations, although this number will vary with requirements. The stations are aligned and are either variably or equidistantly spaced. The main stations may be considered as divided into two sections, an assembling section (stations 4 through 10) generally indicated at 32 and a bending section (stations 11 through 16) generally indicated at 33. The work stations are all at the same level, being supported by a rectangular framework 34 in section 32 and a similar but wider framework 35 in section 33. At each work station are a pair of tube clamps 36 which hold the pre-cut lengths of tube 37 in positions substantially perpendicular to their direction of travel through the stations. A typical tube clamp is seen in FIG. 18, comprising a reciprocable motor 38 having an upwardly extending piston rod 39 connected to a pair of links 40, the outer ends of these links being connected to jaws 41 pivoted at 42 and having recesses 43 to grasp tube 37. Upward extension of piston 39, as seen in FIG. 18, will retract jaws 41 while downward movement of the piston rod will close the jaws around the tube. At most stations, the jaws will tightly grip the tube but at aligning stations 5, 8 and 11 the depth of grooves 43 is slightly larger than the tube so as to allow axial movement thereof, as will later appear.

The means for indexing tubes 37 along the work stations comprises transfer means generally indicated at 44 located between each pair of adjacent work stations. This transfer means comprises a shaft 45 rockably mounted on framework 34 or 35 and equidistantly spaced between its adjacent work stations. Each shaft has a pair of transfer arms 46 secured to and extending radially therefrom (FIGS. 5 to 8), the outer end of the arms carrying grab clamp assemblies generally indicated at 47. Means are provided for simultaneously rocking shafts 45 between first positions as shown in FIGS. 2, 3 and 4 in which they grasp tubes 37 at work stations where operations have been completed, and swinging assemblies 47 along arcuate paths upwardly, forwardly and downwardly until the tubes reach the next work stations where they will be released. The means for rocking shafts 45 comprises racks 48 slidable on frameworks 34 and 35 and controllable by rack cylinders 49 and check cylinders 51, typically shown on framework 35 in FIGS. 3 and 4. Racks 48 mesh with pinions 52 on shafts 45. Thus, the workpieces will not be dropped out of the work stations by gravity but rather lifted above them for transfer.

The construction of a suitable grab clamp assembly 47, as well as its operation, is seen in FIGS. 9 through 14. The assembly comprises a reciprocable motor 53 carrying a pair of facing parallel guides 54 mounted on opposite side plates 55. Piston rod 56 of motor 53 has a clevis connected by a pin 57 to a pair of links 58 the outer ends of which are pivoted to jaws 59. Pin 57 is guided by slots in plates 55. Jaws 59 have replaceable outer portions 60 for different diameters of tubes. Arcuate projecting central portions on opposite sides of the jaws are held in pivotal relation with each other by rings 61 which are slipped thereover. The outer ends of jaw portins 60 have recesses 62 for holding a tube 37 against movement in any direction. The inner ends 63 of jaws 59 ride inside guides 54 as piston rod 56 moves from its retracted toward its extended positions (FIGS. 11 through 14). While so doing, jaws 59 are open. After jaw portions 63 reach the ends of the guides further extension of piston rod 56 will cause them to move outwardly as links 58 straighten (FIG. 14), thus closing the jaws around the tube. The closing movement is insured by engagement of pivot rings 61 with the ends 64 of internal slots 65 in side plates 55 (FIGS. 9, 10, and 13), thus limiting further extension of the jaws. The tops and bottoms of rings 61 are flattened to ride in slots 65.

Figures 12, 13:
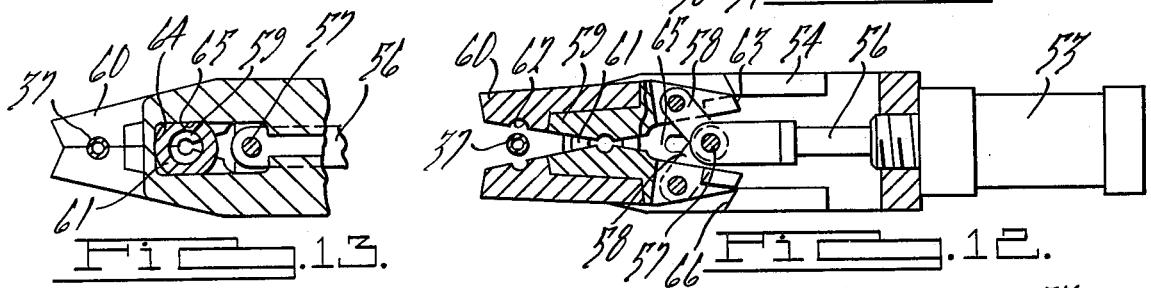
FIG. 12 is a view similar to FIG. 11 showing the grab clamps in their extended but still open position.
FIG. 13 is a fragmentary side elevational view in cross-section taken along the line 13—13 of FIG. 10 showing schematically how the jaw pivot rings engage the ends of the side plate slots to initiate clamping movement of the jaws.
Figure 14:
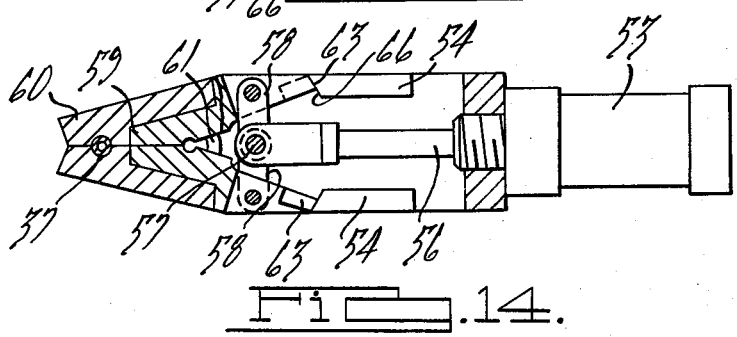
FIG. 14 is a view similar to FIG. 12 showing the clamping jaws in their closed position.

Retraction of piston rod 56 will initially cause the cammed end surfaces of jaw portions 63 to ride inwardly toward each other on the complementary ends of guides 54, thus initially opening the jaws (FIG. 14 to FIG. 12). Further retraction of piston rod 56 will retract the jaws away from the tube so that the transfer mechanism is free to swing to its other position.

As will be described below with respect to the control diagrams, means are provided for preventing release of tube 37 by jaws 41 at each work station until jaws 59 of the transfer mechanism have engaged the tube, and further means prevent release of the transfer jaws until the tube clamps at the next work station have engaged the tube. Thus, it is impossible for the tube to have unwanted movement either parallel to its own axis or in the direction of transfer movement, and the various operations may be performed accurately.

Means are provided for permitting adjustment of clamp assemblies 47 in several different directions with respect to the work stations. As seen in FIGS. 5 and 6, this means includes a split tapered bushing 66 which secures arm 46 to shaft 45, thus allowing adjustment of the arm along the shaft. Bushing 66 is carried by a sleeve 67 slidably mounted on shaft 45 and is used to clamp the sleeve to the shaft in its adjusted position.

Sleeve 67 carries a bearing support 68 in which arm 46 is adjustably mounted. Thus, the effective length of arm 46 may be adjusted, and it may also be rotated on its own axis. It is locked in position by a split tapered bushing 69.

A post 70 extends upwardly from grab clamp assembly 47 and extends through a split tapered bushing 71 carried by a sleeve 72 at the outer end of arm 46. This permits assembly 47 to be angularly adjusted about the axis of post 70. Thus, the transfer means may be adjusted at the individual work stations for the particular part being fabricated, so as to be clear of clamps 36 and grasp the workpieces at the proper locations for transfer.

A cutting machine is indicated schematically at 73 which will cut the bulk tube into identical lengths 37. These lengths are fed by means such as a ratchet-operated feed wheel 74 and a reciprocating tube feeder schematically shown at 75 to the first transfer mechanism 44. In the illustrated embodiment, the tube is shown as receiving fittings at its opposite ends with the tube ends being flared after the fittings are put on. At station 5, a fixed magnetic stop 76 is provided and a reciprocable alignment device 77 urges the tube end against this stop. Tube clamps 36 at this station allow axial movement to take place and will hold the tube in this adjusted position in readiness for transfer to station 6 which has a fitting feeder 78 to place a first fitting 79 on one end of the tube. At station 7, this end of the tube is flared.

In order to move fitting 79 inwardly from the tube end and thus expose it for the flaring operation, a pair of shaped plates 81, 82 (FIG. 15) are provided between each fitting feed station and its following flare station. These plates have an arcuate slot 83 therebetween into which tube 37 enters. The plates are set at an angle (FIG. 3) so that fitting 79 will be pushed axially inwardly along the tube as it is transferred to the flare station.

A flaring press 84 is located at station 7, this press having a pair of dies 85, 86 for holding the end of the tube and a punch 87 for flaring the end. Die 86 is stationary and die 85 horizontally movable toward and away from die 86, these dies having recesses for securing the tube. Tube clamps 36 at station 7 are movably mounted and are actuatable by reciprocable motors 88. After clamps 36 have secured tube 37 and transfer mechanism 44 has released it, clamps 36 will be moved toward stationary die 86 so that tube 87 may enter the recess thereof. Die 85 will then clamp a tube end and punch 87 will form the flare. Die 85 will be retracted and clamps 36 retracted so that tube 35 will clear stationary die 86 when it is lifted out by the next transfer mechanism.

The tube will then be aligned at its other end at station 8 by a fixed magnetic stop 89 and an alignment device 91, the tube again being held loosely by clamps 36. A fixed fitting rake 91 is provided at station 8 for holding fitting 79 as tube 37 is end-aligned, thus moving the fitting into non-interfering relation with the next transfer mechanism. The tube will then be moved to station 9 where a fitting 92 will be placed on its other end by a fitting feeder 93, and then to station 10 where that end will be flared. Plates 82, 83 similar to the previous plates are provided between stations 9 and 10, and the dies, punch and movable clamps at station 10 are similar to those at station 7. The flaring press at station 10 is indicated at 94.

Bending section 33 is wider than section 32 so that tubes 37 are within the lateral confines of framework 35. The first station, station 11, is an end-aligning station having an adjustable magnetic stop 95 and an alignment cylinder 96 which urges a fitting rake 97 (FIG. 16) against fitting 79 to engage stop 95. A fitting rake 98 is provided at the other end of tube 37, movable by a cylinder 99.

Stations 12 through 16 are bending stations at which each tube 37 is formed progressively outwardly toward its ends. The transfer arms 46 and grab clamps 47 at these stations are adjustable in all directions to permit easy pick-up of the bent tubes, as shown and described with respect to FIG. 5 and 6.

Figure 20:
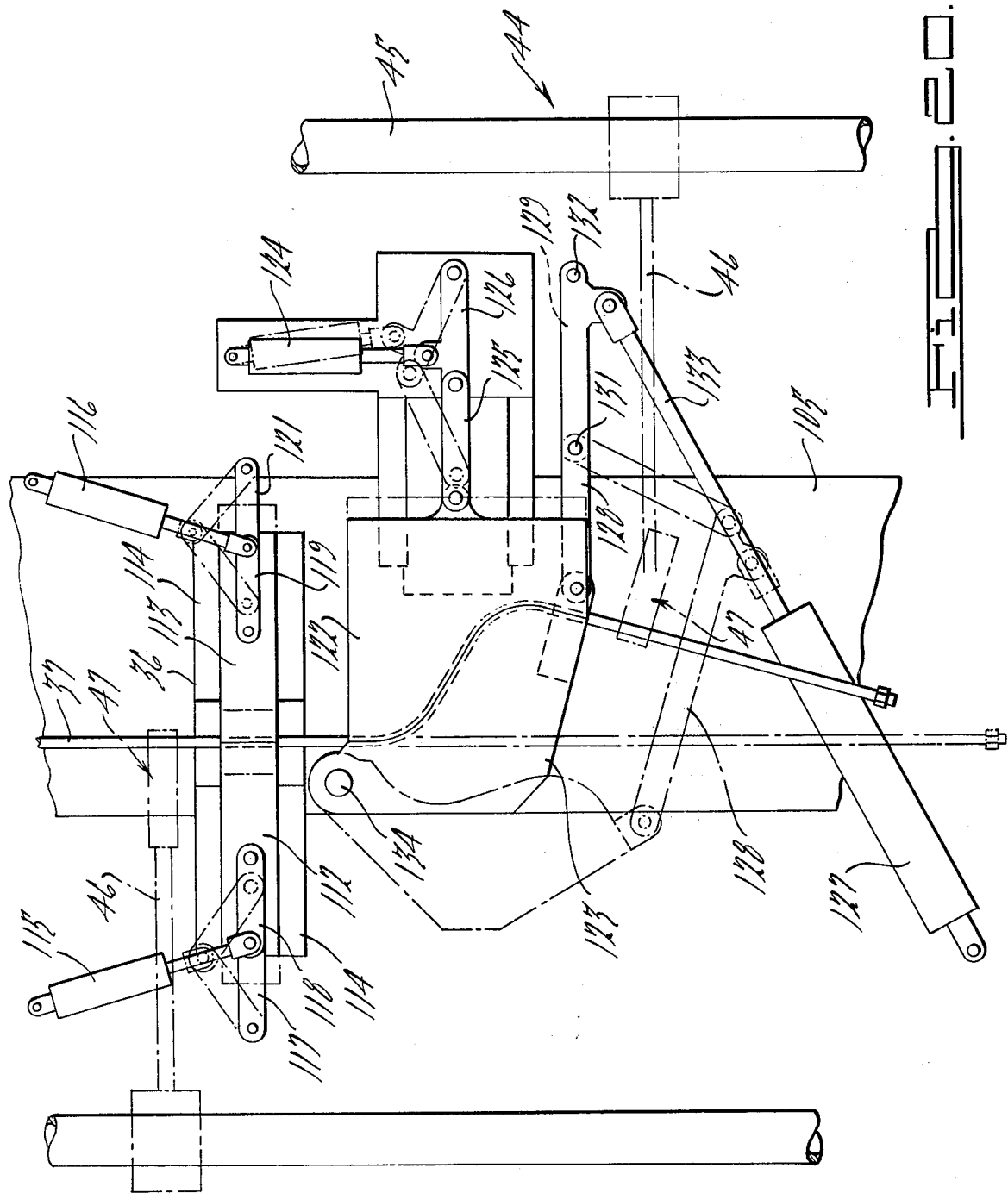
FIG. 20 is a fragmentary top plan view of a typical bending module

The means for bending tubes 37 at these stations comprise replaceable tooling bars or modules 100, 101, 102, 103 and 104 at stations 12 through 16 respectively. A typical tooling module construction is seen in FIGS. 17 and 20. The module comprises a tooling bar 105 which is mounted on framework 35 by brackets 106, 107 which suspend the tooling bar below the level of tubes 37. Dowels 108 (FIG. 4) are used for locating the tooling bars, these dowels coacting between frame 35 and brackets 106 and 107. Crane hooks 109 may be used for lifting the tooling bar when it is to be replaced, these hooks being engageable with lifting eyes 110.

Tooling modules 100 and 101 at stations 12 and 13 have one tube clamp 36 respectively. Stations 14 through 16 have two tube clamps each. At stations where fittings 79 or 92 could tend to slide into interfering relation with clamps or dies because of the orientation of the tube, air blast nozzles indicated schematically at 111 may be provided to hold the fittings at the ends of the tube.

FIG. 20 shows the construction on a portion of a typical tooling bar 105, tube clamps 36 comprising grooved dies 112 and 113 in guides 114. These dies are actuated by cylinders 115 and 116 carried by bar 105, through links 117, 118 and 119, 121 respectively. A back-up die 122 and a bending die 123 are mounted on the tooling bar, die 122 being reciprocably mounted and actuated by a motor 124 through links 125, 126. Die 123 is controlled by a motor 127, mounted on tooling bar 105, through a link 128. The outer end of this link is guided in its motion by a link 129 pivotally connected at 131 to tooling bar 105 and connected at its other end 132 to the outer end of link 128. When tube 37 is placed in position and secured by clamps 112, 113, dies 122 and 123 will be in their dot-dash line positions. They will then move to their solid line positions, bending tube 37 as shown in FIG. 20. Die 122 will rotate around pivot 134 to bend the tube 37 into the shape shown.

After the bending dies have formed the tube, grab clamps 47 of the next transfer mechanism 44 will secure the tube and prevent it from moving. Motors 124 and 127 may then be caused to retract bending dies 122 and 123, and cylinders 115 and 116 will cause tube clamps 112 and 113 to be retracted. When this has been accomplished, shaft 45 of transfer mechanism 44 will rotate through 180°, advancing the partially bent tube to the next bending station. The tube at the prior station will be similarly advanced to this station in preparation for the next bending sequence. It should be kept in mind that FIG. 20 only illustrates a portion of the mechanism mounted on a tooling bar 105 and that similar tooling and clamps will be mounted at the other end of the same bar if required.

A bundle conveyor 135 (FIG. 19) may be mounted after station 16 to receive the bent tubes in compartments 136. A counter and index controls schematically indicated at 137 are provided for moving conveyor 135 in increments by means of a reciprocable motor 138 to a bundle taping or tying device schematically shown at 139. The bundles 140 may then be transferred by means indicated schematically at 141 to a conveyor 142.

Figure 21:
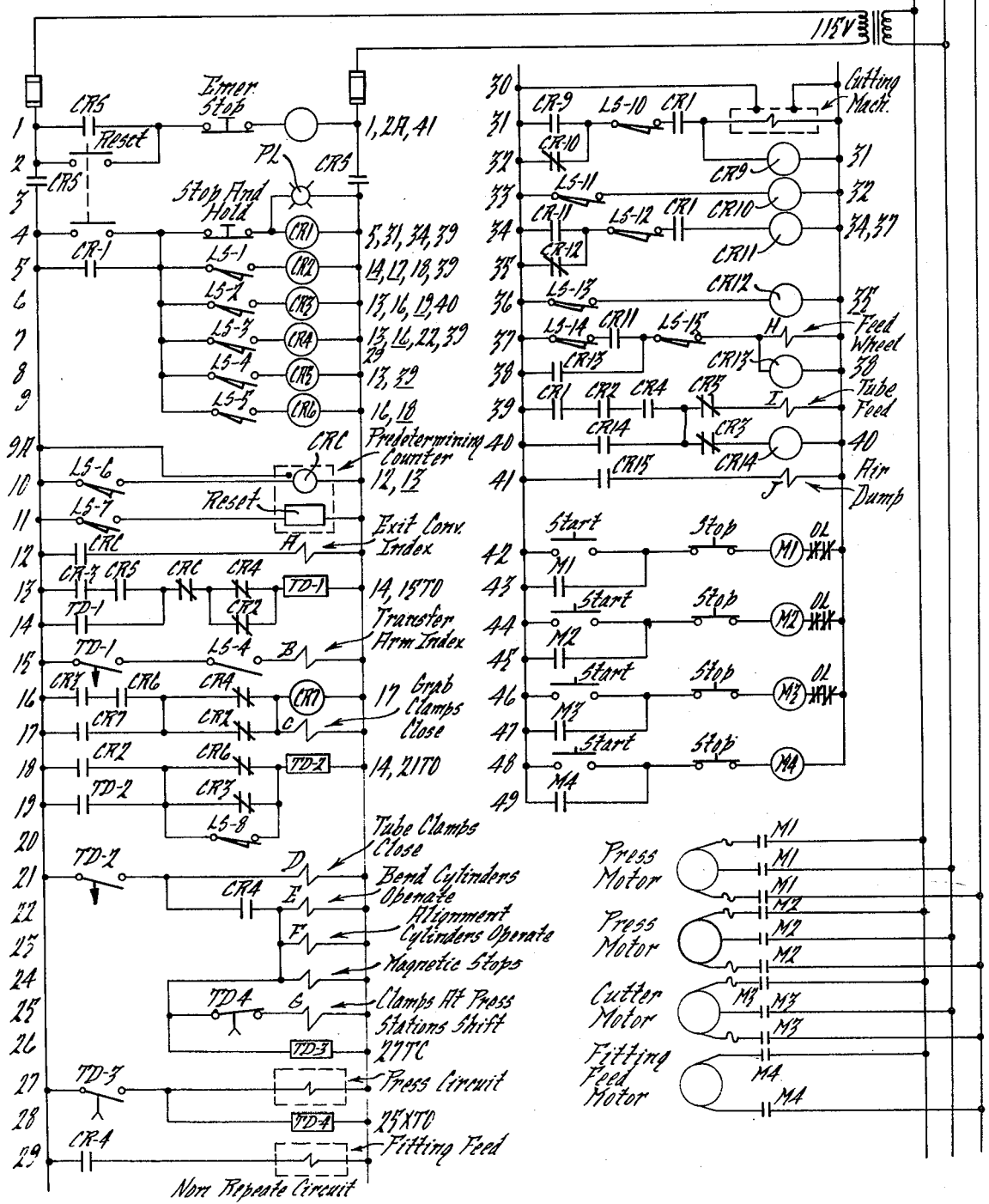
FIG. 21 is a wiring diagram of the tube fabricating apparatus.
Figure 24:
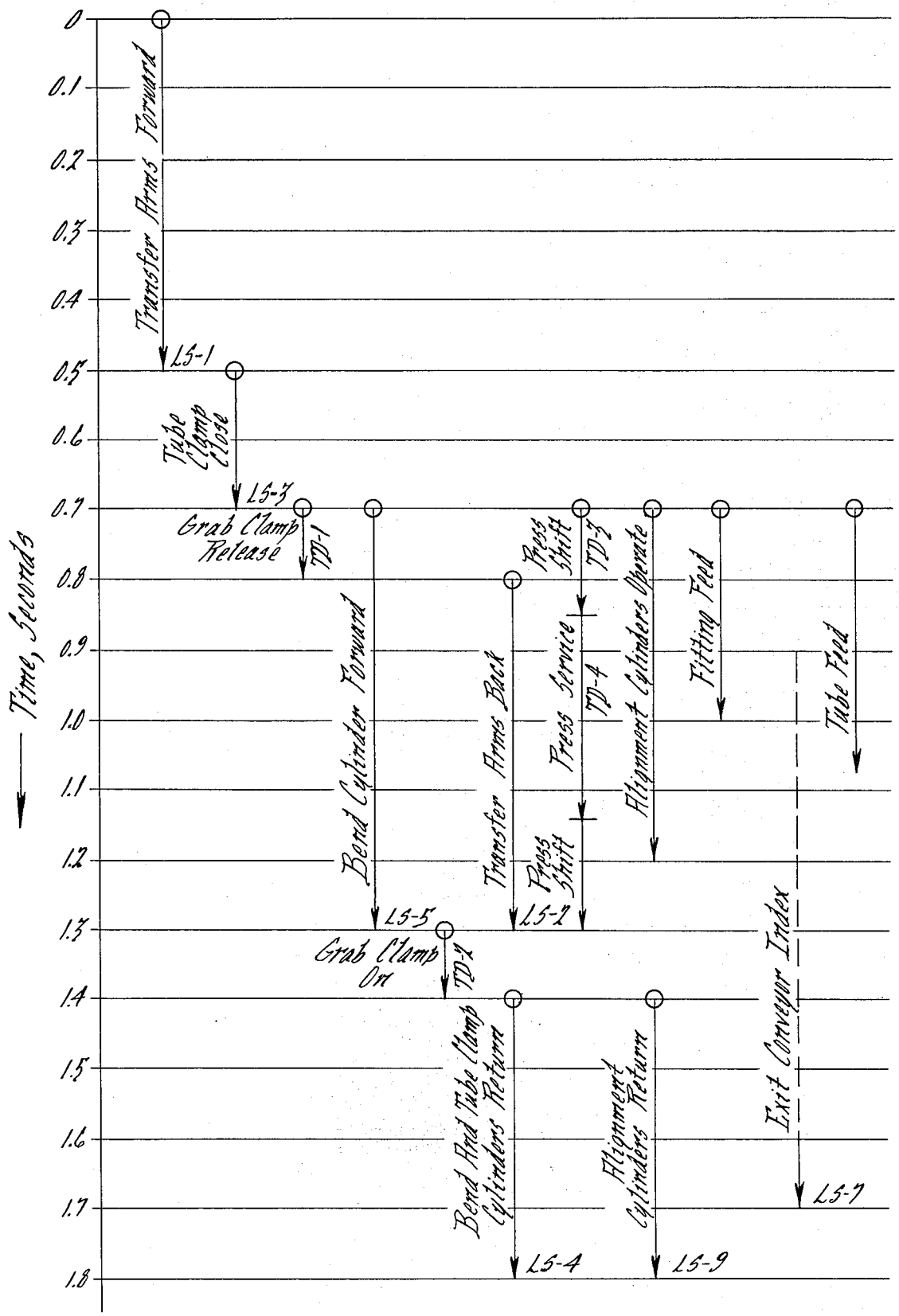
FIG. 24 is a diagram showing a typical sequence of operations for the apparatus.

FIGS. 21 through 24 show the controls and actuating means for the system as well as a schematic location of the air cylinders and limit switches, and a typical sequence of operations. The functions of the limit switches shown in FIG. 21 are as follows:

| Switch No. | Function |
|---|---|
| LS-1 | Closed when transfer arms are at forward position. |
| LS-2 | Closed when transfer arms are at rear position. |
| LS-3 | Closed when tube clamps are closed. |
| LS-4 | Closed when tube clamps are open. |
| LS-5 | Closed when bend clamps are closed. |
| LS-6 | Closed momentarily when each completed part drops to exit conveyor. |
| LS-7 | Closed when exit conveyor index cylinder in forward position. |
| LS-8 | Opens when shift device at press station on center position. |
| LS-9 | Closed when alignment cylinders are retracted. |
| LS-10 | Opens when maximum quantity of cut tubes available. |
| LS-11 | Opens when minimum quantity of cut tubes available. |
| LS-12 | Opens when maximum level of tubes present in tube magazine. |
| LS-13 | Opens when minimum level of tubes present in tube magazine. |
| LS-14 | Closes when feed wheel ratchet cylinder retracted. |
| LS-15 | Opens when feed wheel ratchet cylinder at out position. |

In operation, assume a starting position in which transfer arms 46 are in their rear position grasping tubes 37, with reset switch previously actuated to close CRS and valve J (FIG. 22) operated to supply compressed air to the solenoid operated fourway normally closed valves A through I. Cylinders 49 will be activated through valves B to rock transfer arms 46 forward, carrying the tubes 37. When the transfer arms reach their forward position, limit switch LS-1 will be actuated. This will energize CR 2, in turn energizing time delay relay TD-2. This will close tube clamps 36 at the stations to which tubes 37 have been delivered, through valves D. Closure of the tube clamps will actuate LS-3, thus energizing CR 4 which de-energizes CR 7 and causes grab clamps 47 to be released and retracted through valves C and grab clamp cylinders 53. Thus, it is assured that tube clamps 36 hold the tubes before grab clamps 47 are released. Energization of CR 4 will also cause press station shift cylinders 88 to be actuated through valves G to move tube clamps 36 at stations 7 and 10 in the manner previously described, seating the tubes in stationary clamping dies 86. When the press shift is completed, closure of time delay switch TD-3 will cause the strokes of presses 78 to take place, and subsequent delayed opening of TD-4 will cause cylinders 88 to retract clamps 36 at those stations.

Energization of CR 4 will also cause alignment cylinders 77 and 91 to operate, fitting feed devices 78 and 93 to place fittings on the tubes and will actuate bend cylinders 124, 127 through valves E. Tube feed 75 will also be actuated through valve I.

Energization of CR 4 will also cause previously energized time delay relay TD-1 to become de-energized, with its switch controlling valves B opening after a short time delay. This will cause transfer arms 46 to swing back to their previous position, it being noted that the swinging of these arms will take place only after grab clamps 47 have been released and retracted from the tubes.

Complete extension of bending cylinders 124 and 127 will cause LS-5 to close. At approximately the same time, LS-2 will be closed by arrival of transfer arms 46 at their rearward positions.

Closure of LS-2 and LS-5 will energize CR 3 and CR 6 respectively. This will in turn energize CR 7 to extend and close grab clamps 47 through valves C, and de-energize TD-2. After a time delay controlled by TD-2 to assure that grab clamps 47 have gripped the tubes, bend cylinders 124 and 127 will return and tube clamp cylinders 115 and 116 will open clamps 36 through valves E and D respectively. Retraction of alignment cylinders 77, 91 will close LS-9. Opening of tube clamps 36 will cause LS-4 to close, energizing CR 5 to close TD-1 and thus move the transfer arms forward through valves B, repeating the cycle.

Although the above description of operations omits a number of ancillary operations which will be evident from the drawings, it brings out the fact that tubes 37 will at all times be held securely against undesired lateral or longitudinal movement. The arrangmeent of sequential controls and limit switches prohibits retraction of tube clamps 36 at the work stations until after grab clamps 47 of the transfer mechanisms 44 have secured the tubes against lateral movement, and the grab clamps in turn will not release the tubes until the tube clamps at the next stations have secured them.

We claim:
1. A tube fabricating apparatus comprising:
   a. a plurality of work stations each having
      i. an independently operable work performing mechanism, and
      ii. tube clamping means operable to support a tube during the performance of work thereon,
   b. transfer means for successively advancing tubes between work stations,
      said transfer means including a plurality of grab clamps operable to support tubes during their movement to or from a work station;
   c. means for preventing the disengagement of said grab clamps from the tubes gripped thereby until after the tubes have been secured by the clamping means of a work station to which they are delivered, and
   d. power operated means for opening and closing said tube clamping means with tubes supported in stationary positions therein by said grab clamps.

2. The combination according to claim 1, said work stations being aligned, said transfer means including rockable shafts mounted between said work stations, said grab clamps being mounted on said shafts, and means oscillating said shafts in unison whereby said clamps will swing between said work stations.

3. The combination according to claim 2, said oscillating means comprising gears on said shafts and reciprocable rack means meshing with said gears.

4. The combination according to claim 2, further provided with means for adjusting the lateral positions of said grab clamps on said shafts.

5. The combination according to claim 4, further provided with a framework supporting opposite ends of said work stations and shafts, each work station comprising a tooling bar extending between the sides of said framework and removably supported thereon, at least some of said bars supporting the tube clamping means.

6. The combination according to claim 5, said tube clamping means comprising a pair of guides mounted on said bar, a pair of clamps slidably mounted in said guides, and reciprocable motor means mounted on said bar and operating said clamps.

7. The combination according to claim 5, including tube bending means having dies movably mounted on said tooling bar and reciprocable motor means mounted on said tooling bar and operating said dies.

8. The combination according to claim 7, the bending dies of said work stations being located successively outwardly toward the ends of said tubes.

9. The combination according to claim 2, said transfer means further comprising arms mounted on and extending from said shafts, said grab clamps being mounted on said arms, means for adjusting said arms along said shafts, and means for rotatably adjusting said grab clamps on the arm axis and perpendicular to said axis, whereby said grab clamps may be adjusted to accommodate a variety of tube shapes.

10. The combination according to claim 2, at least two grab clamps being mounted on each of said shafts, said grab clamps being held by arms secured to and extending outwardly from the shafts.

11. The combination according to claim 1, said means for preventing disengagement of the grab clamps comprising limit switch means actuatable in response to closing of said work station clamping means to release said grab clamps.

12. The combination according to claim 10, further provided with means responsive to securing of said tubes by the clamping means of a work station for operating a tube bending means of that station, time delay means responsive to securing of the tubes by the clamping means of a work station for returning the transfer means to the previous work station for the next tube and causing the grab clamps to grip said next tubes, and means responsive to disengagement of said tubes by said tube clamping and bending means at the work stations for causing said transfer means to carry said next tubes to their succeeding stations.

13. The structure set forth in claim 1 in which said work stations include at least one end forming station and one bending station.

14. The combination according to claim 13, one of said work stations being a fitting feed station for placing a fitting on one end of the tube, said end forming station having a flare press for flaring said end of the tube, said bending station being located past said end forming station.

15. The combination according to claim 13, including an alignment station between said tube supply and end forming station, said alignment station having a stop and means for moving a tube parallel to its length against said stop to align one end of the tube with said end forming station.

16. The combination according to claim 15, said transfer means further comprising rockable shafts between said stations and arms on said shafts carrying said grab clamps, and means for rocking said shafts in unison.

17. The combination according to claim 14, said transfer means comprising rockably mounted shafts between said stations, said grab clamps being mounted on said shafts, and means for shifting the fitting along said tube between said fitting feed station and end forming station, said last-mentioned means comprising plates forming an arcuate slot and set angularly with respect to the path of movement of said tubes, the tubes travelling through said slot during the transfer movement.

18. The combination according to claim 14, the flare press at said end forming station having a pair of dies for holding the tube against movement along its axis, one of said dies being fixed, and a punch movable in the direction of the tube axis, tube clamps at each of said work stations for holding the tubes placed therein, means supporting the tube clamp at said end forming station for movement toward and away from said fixed die, and means responsive to arrival of each tube between said flare press dies for moving said tube clamp at the end forming station toward the fixed die.

19. The combination according to claim 13, there being a plurality of bending stations in succession, the bending stations having dies for bending portions of the tube progressively closer to its ends, an alignment station before the first of said bending stations, an adjustable stop at one end of said alignment station, means for moving said tube against said stop, and tube clamps at each of said stations, the tube clamps at said alignment station loosely retaining the tube so as to permit said alignment to take place.

20. The combination according to claim 19, said bending stations each comprising a tooling bar suspended below and extending transversely of the path of movement of said tubes, and means removably mounting said tooling bars.

21. The combination according to claim 13, further provided with tube clamps at said work stations, means for preventing the retraction of said work station tube clamps until said grab clamps have engaged the tubes, and means for preventing the retraction of the grab clamps until the tube clamps at the next work stations have engaged said tubes.

22. The combination according to claim 13, at least one of said work stations comprising an assembling station, and means at said assembling station for assembling a part lengthwise onto said tube.

23. The combination according to claim 22, said apparatus further comprising an alignment station following said tube supply station, means at said alignment station for locating each tube in the direction of its axis, said assembling station being located between said alignment station and said end forming station and having means for placing a fitting on one end of the tube, said end forming station having means for flaring said end of the tube, a second alignment station after said end forming station, means at said second alignment station for locating the other end of said tube in the direction of its axis, a second fitting feed station after said second alignment station and a second flaring station after said second fitting feed station.

24. The combination according to claim 23, there being a plurality of bending stations, and means at at least one of said bending stations for holding a fitting at the end of said tube, said last-mentioned means comprising an air blast nozzle.

25. A tube bending apparatus comprising:
a. a plurality of equidistantly and longitudinally spaced work stations;
   each work station having a laterally extending tooling bar removably suspended below the level of tubes being transferred, a pair of longitudinally slidable tube clamping jaws mounted on said bar, a pair of bending dies mounted on said bar, and reciprocable motor means for actuating said clamping jaws and bending dies;
b. a plurality of rockable shafts equidistantly spaced between said work stations above the level of said tooling bars;
c. at least two arms secured to and extending outwardly from each shaft;
d. tube grab clamps mounted at the outer end of each arm;
e. means for adjusting the position of each arm along its shaft and longitudinally and rotationally adjusting each grab clamp with respect to its arm;
f. means carried by each arm for moving its clamp outwardly and then into engagement with a tube;
g. means for rocking said shafts in unison to simultaneously transfer tubes to succeeding work stations and then return the clamps to their previous positions;
h. means for withdrawing the tube clamping jaws at each work station in response to gripping of the tube by the grab clamps; and
i. means causing the grab clamps to release the tube in response to engagement of the tube with the clamping jaws at the next work station.

26. A tube fabricating apparatus comprising:
a. a plurality of equidistantly spaced and aligned work stations;
b. a tube supply station before the first work station providing a supply of tubes cut to a predetermined length;
c. transfer means including shafts located equidistantly between said work stations and between the supply station and first work station, transfer arms extending from said shafts, grab clamps on the ends of said transfer arms, means sequentially extending, closing, opening and retracting said grab clamps, and means rocking said shafts in unison whereby the clamps will swing between adjacent work stations;
d. a first section of work stations having means for sequentially end-aligning one end of the tube, placing a fitting on said end, flaring said end, end-aligning the other end of the tube, placing a fitting on said other end and flaring said other end;
e. a second section of work stations comprising bending stations, each bending station having a tooling bar extending transversely to and below the path of tube movement, removably mounted at the work station and carrying bending dies, the bending dies at successive bending stations being engageable with portions of the tube progressively toward the ends thereof;
f. tube clamps at each of said work stations, the tube clamps at the aligning stations being loose to permit said end-aligning movement to take place;
g. means preventing release of the tube clamps at each work station until the grab clamps of the next succeeding transfer shaft have engaged the tube; and
h. means for preventing release of the grab clamps after the tube has been moved to the next succeeding station until the tube clamps at that station have engaged the tube.

27. A tube bending apparatus comprising:
a. a plurality of rectilinearly spaced work stations each having tube clamping means and independently operable tube bending means, and
b. transfer means for simultaneously advancing tubes between work stations with the tubes oriented transversely of their direction of travel,
c. said bending means at each work station being operable to bend separate portions of the tubes received therein,
d. said clamping means at each work station being operable to support and position the tubes while they are bent, and
e. said transfer means being operable to maintain the positions of the tubes transversely of the direction of advancement of the tubes as they are advanced between work stations,
f. one of said transfer and clamping means being constantly engageable with each of said tubes during their presence in said bending apparatus.

28. A tube fabricating apparatus comprising:
a. a plurality of spaced work stations each having
  i. an independently operable work performing mechanism,
  ii. a clamping mechanism operable to support and position a tube during the performance of work thereon;
b. a plurality of transfer arms pivotally mounted in locations between said work stations,
c. a pair of tube engaging jaws mounted on the end of each of said transfer arms,
d. first power operated means for moving each of said pair of jaws longitudinally of the arm on which it is mounted into and out of surrounding relation with tubes supported in the clamping mechanisms of said work stations; and
e. second power operated means for simultaneously pivoting said transfer arms to advance tubes between work stations.

29. A tube fabricating apparatus comprising:
a. a plurality of spaced work stations;
b. transfer means for successively advancing tubes to be fabricated between work stations with the tubes disposed parallel to one another and perpendicular to their direction of travel;
c. clamps at said work stations for supporting said tubes;
d. one of said work stations comprising an end alignment station having an abutment engageable with one end of a tube at said one station and means for producing endwise movement of a tube at said one station against said abutment, the clamp at said one station having a fit on the tube supported thereby which permits endwise sliding movement of the tube held thereby.

30. The structure set forth in claim 29 in which said transfer means includes grab clamps operable to hold the endwise alignment of said tubes as the tubes are moved between work stations.

* * * * *